United States Patent
Roe (10) Patent No.: US 9,878,653 B2
(45) Date of Patent: Jan. 30, 2018

(54) TIE DOWN STRAP SYSTEM FOR VEHICLES

(71) Applicant: Kevin Roe, Cameron Park, CA (US)

(72) Inventor: Kevin Roe, Cameron Park, CA (US)

( * ) Notice: Subject to any disclaimer, the term of this patent is extended or adjusted under 35 U.S.C. 154(b) by 0 days.

(21) Appl. No.: 15/202,466

(22) Filed: Jul. 5, 2016

(65) Prior Publication Data
US 2017/0001552 A1 Jan. 5, 2017

Related U.S. Application Data

(60) Provisional application No. 62/188,641, filed on Jul. 4, 2015.

(51) Int. Cl.
*B60P 3/079* (2006.01)
*B60P 7/08* (2006.01)

(52) U.S. Cl.
CPC ............ *B60P 3/079* (2013.01); *B60P 7/0823* (2013.01)

(58) Field of Classification Search
CPC .............................. B60P 3/079; B60P 7/0823
USPC ......................................... 410/3, 4, 7, 23, 97
See application file for complete search history.

(56) References Cited

U.S. PATENT DOCUMENTS

| | | | | |
|---|---|---|---|---|
| 5,005,827 A * | 4/1991 | Steinbrecher | ............ | A63B 5/04 24/303 |
| 5,553,981 A * | 9/1996 | Braden | ................. | B60P 7/0869 24/115 R |
| 5,682,653 A * | 11/1997 | Berglof | ..................... | G09F 1/10 224/183 |
| 5,800,106 A | 9/1998 | Miller | | |
| 6,035,741 A | 3/2000 | Krizman, Jr. | | |
| 7,322,068 B1 * | 1/2008 | Kim | ....................... | A47K 10/02 15/209.1 |
| 8,167,263 B1 | 5/2012 | Zampelli | | |
| 8,458,864 B1 * | 6/2013 | Patton | ................... | A61F 5/3792 24/16 R |
| 8,590,121 B1 * | 11/2013 | Patt, Jr. | ................. | A43B 3/0078 24/713.1 |
| 2006/0032026 A1 * | 2/2006 | Schoening | ........... | A41D 25/003 24/66.1 |
| 2006/0177282 A1 | 8/2006 | Blosser | | |

(Continued)

OTHER PUBLICATIONS

Tucker Rocky Distribution, BikeMaster Since 1933, http://www.bikemaster.com/swivel-soft-hook-tie-downs.html/ , last accessed Jul. 22, 2016.

*Primary Examiner* — Hilary L Gutman
(74) *Attorney, Agent, or Firm* — Temmerman Law Office; Matthew J. Temmerman (57) ABSTRACT

A tie down strap system for securing a vehicle to a platform of a transport medium comprises a first strap member, a second strap member, a connecting means having a first slot and a second slot and an attachment means at the second strap member. A front end of the first strap member is connected to a clamp member of the transport medium using a first securing means. A rear end of the first strap member is passed through the first slot to suspend therefrom and a first end of the second strap member is looped through the second slot and a second securing means and sewn thereon and a second end of the second strap member extends and suspends from the second securing means. When the vehicle is loaded on the platform, the first and second strap members secure the vehicle firmly to the platform of the transport medium.

4 Claims, 5 Drawing Sheets

(56) References Cited

U.S. PATENT DOCUMENTS

| | | | |
|---|---|---|---|
| 2009/0041557 A1* | 2/2009 | Lin | B60J 7/104 |
| | | | 410/97 |
| 2009/0071993 A1* | 3/2009 | Joseph | B60P 3/07 |
| | | | 224/488 |
| 2013/0322981 A1 | 12/2013 | Root | |
| 2015/0237938 A1* | 8/2015 | O'Neill | A41F 1/002 |
| | | | 2/322 |
| 2016/0003269 A1* | 1/2016 | Russell-Clarke | A41F 1/002 |
| | | | 24/303 |
| 2016/0010673 A1* | 1/2016 | Russell-Clarke | A41F 1/002 |
| | | | 361/729 |
| 2016/0025119 A1* | 1/2016 | Russell-Clarke | A41F 1/002 |
| | | | 24/303 |

\* cited by examiner

TIE DOWN STRAP SYSTEM FOR VEHICLES

RELATED APPLICATIONS

This application claims priority from the U.S. provisional application with Ser. No. 62/111,641, which was filed on Jul. 4, 2015. The disclosure of that provisional application is incorporated herein as if set out in full.

BACKGROUND OF THE DISCLOSURE

Technical Field of the Disclosure

The present embodiment relates in general to the field of tie down devices. More specifically, the present disclosure relates to a tie down strap system for securing a vehicle safely to a truck/trailers.

Description of the Related Art

The loading and conveying of many types of modern automobiles upon the beds of trucks/trailers entails the risk of damage to various areas of the modern motorcycle, the transport medium, and even the individual loading the motorcycle. This necessitates securing the vehicle in a manner that keeps it safely attached to the transport medium while minimizing or eliminating damage to the vehicle.

Conventional vehicle tie down devices used for transporting vehicles such as motorcycles on truck/trailer beds include tie down straps that are used to hold down cargo or equipment during transport. Such tie down straps are conventionally employed to attach to the handlebar of the vehicle being transported, loop over the vehicle, and/or attach to the vehicle. The straps attached to the handlebar may result in bending of the bars during transit and result in damage to the fairing during tie down. Also, when the straps attached to the central steering portion of the handlebar, it may cause obstruction to the view of the driver of the transport medium.

Some of the tie down straps are constructed from high quality webbing and have hooks on each end to secure the strap to an anchor point on the truck or trailer, even though these hooks may cause scratching of the paint on the top portion of the cab of the at least one transport medium. Some of the existing systems provide a quick disconnect motorcycle tie-down system having a female quick disconnect coupler attached to one end of a tie down strap, used to connect to a male coupler fitting machined as the end of an attachment bolt affixed either inside the open end of the handlebar, or threaded into the motorcycle frame or frame component. Although the quick disconnect coupler system provides the fastest means of attaching the tie down strap in a metal-to-metal connection positive lock, the tie down strap can become loose and slide around in the back of the truck. When the motorcycle is loaded there is no way for an average or even above-average sized human to reach all the way down to the other side of an average sized motorcycle and grab the strap, which is on the floor of the bed of the truck which makes it difficult for a user to attach the tie down strap to the truck.

Various other tie down devices are currently available, but none of these devices allow the user to reach the straps easily while holding the motorcycle simultaneously. Another difficulty is that the user has to stretch and reach the straps which causes the suspension of the truck to flex due to the weight of user, thereby making it even more likely to tip over and injure the user. Another disadvantage of the tie down straps is that the user needs to bend down the other side of the vehicle being transported so as to grab the strap while tying the strap to the transport medium.

Therefore, there is a need for a tie down strap system for securing a vehicle safely to at least one transport medium. Such a tie down strap system would be adapted to secure the vehicle to the at least one transport medium without causing damage to the fairing or other parts of the vehicle. Such a tie down strap system would include an attachment means to attach straps to a top portion of a cab which would allow a user to reach the straps easily while holding the vehicle simultaneously. This tie down strap system would secure the vehicle to the at least one transport medium without causing bending of the handlebars or other damage to the motorcycle. Such a tie down strap system would include a magnetic material in at least one portion of the tie down strap assembly that allows the tie down strap to easily attach to the backside of the cab of the at least one transport medium. This tie down strap system having the magnetic material would allow the straps to stick on the top or side portion of the cab and thereby enable the user to easily reach the straps without bending towards the vehicle while securing the vehicle to the at least one transport medium. Further, such a tie down strap system would not require the user to reach over the vehicle for the straps, and thus protects the user from being injured. The present embodiment overcomes the existing shortcomings in this area by accomplishing these objectives.

SUMMARY OF THE DISCLOSURE

To minimize the limitations found in the existing systems and methods, and to minimize other limitations that will be apparent upon the reading of this specification, the preferred embodiment of the present invention provides a tie down strap system for securing a vehicle safely to a platform of the at least one transport medium. The tie down strap system comprises at least a pair of tie down strap assemblies for securing the vehicle to the platform of the at least one transport medium. Each tie down strap assembly comprises a first strap member, a second strap member, a connecting means and an attachment means. The first strap member comprises a front end attached to a first securing means and a rear end having a first holding loop. The first securing means includes a first bend and a second bend. The first bend is secured to a clamp member on the at least one transport medium and the second bend resides in a front end loop by folding the front end of the first strap member over the second bend and sewn thereon. The second strap member includes a first end attached to a second securing means and a second end having a second holding loop. Similar to the first securing means, the second securing means includes a first bend and a second bend.

The connecting means having a first slot and a second slot is configured to interconnect the first strap member and the second strap member. The rear end of the first strap member is passed through the first slot to suspend therefrom. The first end of the second strap member is looped through the second slot and the first bend of the second securing means and sewn thereon thereby defining a first end loop. The second end of the second strap member extends and suspends from the first bend of the second securing means. Thus, the rear end of the first strap member and the second end of the second strap member are suspended from the connecting means.

The attachment means attached to the first end of the second strap member is adaptable to secure the tie down strap assembly on the top portion of the cab of the at least one transport medium. The attachment means comprises a housing containing a magnetic material that is adaptable to secure the tie down strap assembly on the top portion of the cab of the at least one transport medium. Preferably, the magnetic material is a neodymium magnet. The magnetic attraction between the attachment means and metal on the top/side portion of the cab of the at least one transport medium holds the attachment means onto the cab of the at least one transport medium. The attachment means can be sewn into any portions of the second strap member. In one embodiment, the magnet is embedded between the second end of the second strap member and the portion of the second strap member, which are stitched together. The user can even throw the tie down strap assembly on the top/side portion of the cab of the truck to attach the magnetic material to the top portion of the cab of the at least one transport medium when the tie down strap assembly is not in use. In one embodiment, the second securing means and the first securing means are also preferably made of a magnetic material to stick onto the at least one transport medium. The magnetic material is incorporated in any of or any combination of one or more strap members, securing means, holding loops, attachment means and connecting means.

In operation, when the vehicle is loaded on the platform of the at least one transport medium, the user pulls the second securing means to detach the attachment means secured to the top portion of the cab of the at least one transport medium and the second end of the second strap member is encircled over a part of the vehicle and looped the second holding loop over the second bend of the second securing means thereby the tie down strap assembly secures the vehicle firmly to the platform of the at least one transport medium.

In one embodiment, a method for securing a vehicle to the platform of the at least one transport medium employing the tie down strap system is described. The method comprises the steps of: providing a tie down strap system having at least a pair of tie down strap assemblies, each tie down strap assembly comprises a first strap member having a front end attached to a first securing means having a first bend and a second bend that residing in a front end loop by folding the front end of the first strap member over the second bend of the first securing means and sewn thereon and a rear end having a first holding loop, a second strap member having a first end attached to a second securing means having a first bend and a second bend and a second end having a second holding loop, a connecting means having a first slot and a second slot connecting the first strap member and the second strap member, the rear end of the first strap member being passed through the first slot to suspend therefrom and the first end of the second strap member being looped through the second slot and the first bend of the second securing means and sewn thereon thereby defining a first end loop and the second end of the second strap member extends and suspends from the first bend of the second securing means and an attachment means being connected to the first end of the second strap member. The next step in the process is securing the first bend of the first securing means to a clamp member located on each side of the at least one transport medium. Then, attaching the attachment means of each tie down strap assembly to a top portion of each side of a cab or a top of the cab of the at least one transport medium. Then, loading the vehicle onto the platform of the at least one transport medium. After loading the vehicle on the platform of the at least one transport medium, pulling the second strap member of one of tie down strap assembly to detach the attachment means from the top/side portion of the cab of the at least one transport medium and encircling the second end of the second strap member over at least one part of the vehicle. Then, looping the second holding loop at the second end of the second strap member over the second bend of the second securing means and thereafter successively repeating the pulling, encircling and looping steps for connecting another tie down strap assembly of the pair of tie down strap assemblies to secure the vehicle to the platform of the at least one transport medium.

A first objective of the present invention is to provide a tie down strap system for securing a vehicle safely to at least one transport medium.

A second objective of the present invention is to provide a tie down strap system that is adapted to secure the vehicle to the at least one transport medium without causing damage to the fairing or other parts of the vehicle or transport medium.

A third objective of the present invention is to provide a tie down strap system that include an attachment means to attach straps to a top/backside portion of a cab which would allow a user to reach the straps easily while holding the vehicle simultaneously.

A fourth objective of the present invention is to provide a tie down strap system that includes a magnetic material in at least one portion of the tie down strap assembly that allows the tie down strap to easily attach to the top or backside of the cab of the at least one transport medium.

A fifth objective of the present invention is to provide a tie down strap system having the magnetic material is configured to allow the straps to stick on the top or backside portion of the cab and thereby enable the user to easily reach the straps without bending towards the vehicle while securing the vehicle to the at least one transport medium.

A sixth objective of the present invention is to provide a tie down strap system that allows the user to pull the attachment means attached to the top or backside portion of the cab of the at least one transport medium and secure the vehicle safely to the platform of the at least one transport medium without stretching and flexing over the vehicle to grab the straps of the tie down strap system.

Another objective of the present invention is to provide a tie down strap system that allows the attachment means to stick to the top or backside portion of the cab leaving the center portion of the back window free from obstruction by straps.

Another objective of the present invention is to provide a tie down strap system would not require stretching over the vehicle to reach for the straps during loading, and thus protects the user from being injured.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention. Thus, the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term "about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
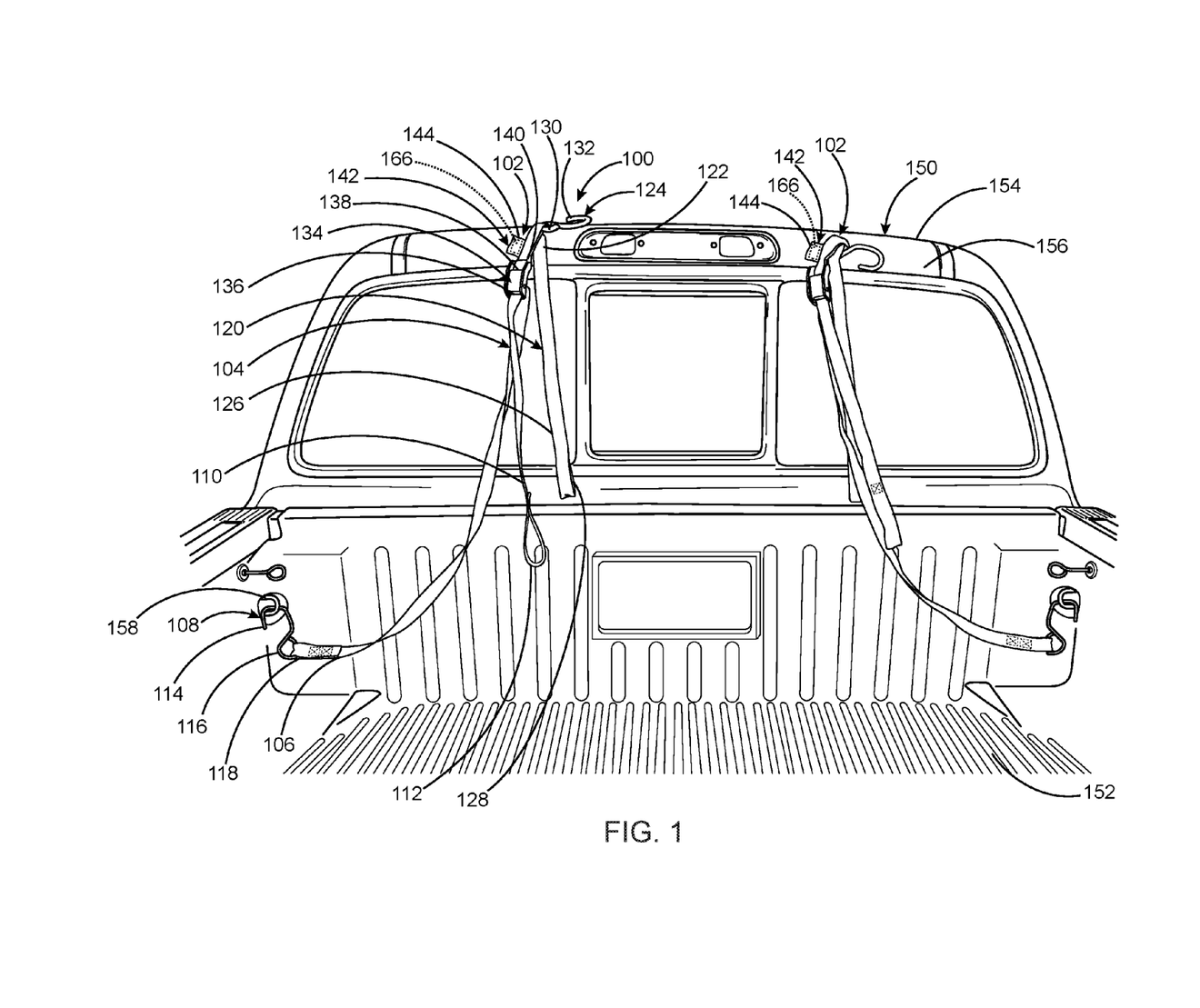
FIG. 1 illustrates a perspective view of a tie down strap system mounted on a top/backside portion of a cab of at least one transport medium in accordance with the preferred embodiment of the present invention.

Turning first to FIG. 1, a perspective view of a tie down strap system 100 mounted on a top portion 156 of a cab 154 of at least one transport medium 150 in accordance with the preferred embodiment of the present invention is illustrated. See also FIG. 3B. The tie down strap system 100 is utilized for securing a vehicle 160 safely to a platform 152 of the at least one transport medium 150. The tie down strap system 100 comprises at least a pair of tie down strap assemblies 102 for securing the vehicle 160 to the platform 152 of the at least one transport medium 150. Each tie down strap assembly 102 comprises a first strap member 104, a second strap member 120, a connecting means 134 and an attachment means 142. The first strap member 104 comprises a front end 106 attached to a first securing means 108 and a rear end 110 having a first holding loop 112. The first securing means 108 includes a first bend 114 and a second bend 116. The first bend 114 is secured to a clamp member 158 on the at least one transport medium 150 and the second bend 116 resides in a front end loop 118 by folding the front end 106 of the first strap member 104 over the second bend 116 and sewn thereon. The second strap member 120 includes a first end 122 attached to a second securing means 124 and a second end 126 having a second holding loop 128. Similar to the first securing means 108, the second securing means 124 includes a first bend 130 and a second bend 132. Preferably, the first securing means 108 and the second securing means 124 is an S shaped hook. The second securing means 124 is coated with rubber so as to prevent the scratching of the paint on the top portion 156 of the cab 154 of the truck 150.

The connecting means 134 having a first slot 136 and a second slot 138 is configured to interconnect the first strap member 104 and the second strap member 120. The connecting means 134 is preferably any conventional buckle assembly which is utilized to secure the first strap member 104 and the second strap member 120. The size, shape and dimension of the connecting means 134 as illustrated is not to be construed as any specific limitation as may apply to this component of the embodiment of the invention. The rear end 110 of the first strap member 104 is passed through the first slot 136 to suspend therefrom. The first end 122 of the second strap member 120 is looped through the second slot 138 and the first bend 130 of the second securing means 124 and sewn thereon thereby defining a first end loop 140. The second end 126 of the second strap member 120 extends and suspends from the first bend 130 of the second securing means 124. Thus, the rear end 110 of the first strap member 104 is suspended from the connecting means 134 and the second end 126 of the second strap member 120 is suspended from the first bend 130 of the second securing means 124.

The attachment means 142 attached to the first end 122 of the second strap member 120 is adaptable to secure the tie down strap assembly 102 on the top portion 156 of the cab 154 of the at least one transport medium 150. The attachment means 142 comprises a housing 144 (See FIG. 3A) containing a magnetic material 166 that is adaptable to secure the tie down strap assembly 102 on the top portion 156 of the cab 154 of the at least one transport medium 150. Preferably, the magnetic material 166 is a neodymium magnet. The magnetic attraction between the attachment means 142 and metal on the top portion 156 of the cab 154 of the at least one transport medium 150 holds the attachment means 142 onto the cab 154 of the at least one transport medium 150. The attachment means 142 can be sewn into any portions of the second strap member 120. In one embodiment, the magnet 166 is embedded between the second end 126 of the second strap member 120 and other portion of the second strap member 120, which are stitched together.

In operation, as shown in FIG. 5, when the vehicle 160 is loaded on the platform 152 of the at least one transport medium 150, the user pulls the second securing means 124 to detach the attachment means 142 secured to the top portion 156 of the cab 154 of the at least one transport medium 150 and the second end 126 of the second strap member 120 is encircled over a part of the vehicle 160 and looped the second holding loop 128 over the second bend 132 of the second securing means 124 thereby the tie down strap assembly 102 secures the vehicle 160 firmly to the platform 152.

Figure 2:
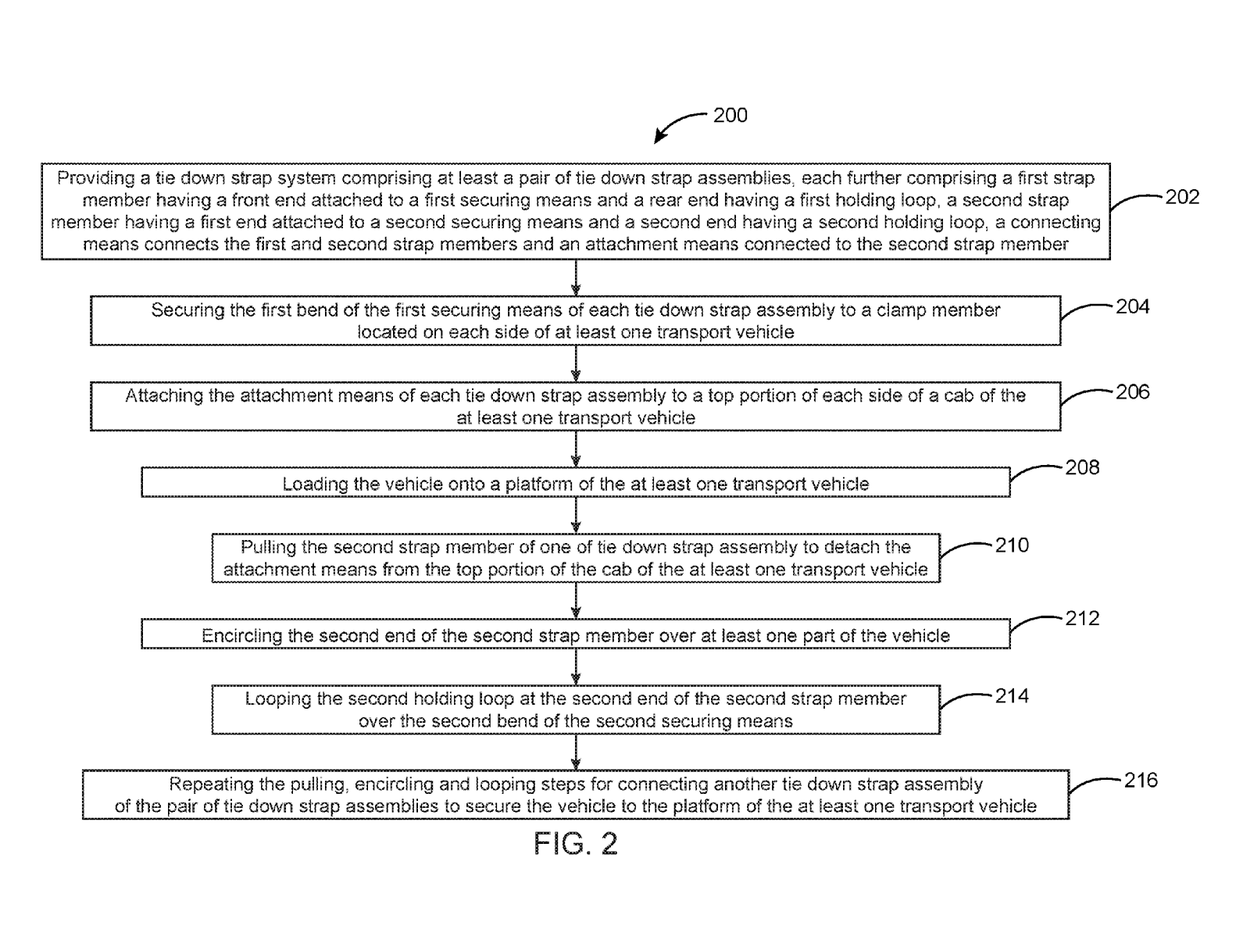
FIG. 2 illustrates a flowchart of a method for securing a vehicle to a platform of the at least one transport medium employing the tie down strap system in accordance with the preferred embodiment of the present invention.

FIG. 2 illustrates a flowchart of a method 200 for securing a vehicle to the platform of the at least one transport medium employing the tie down strap system in accordance with the preferred embodiment of the present invention. The method comprises the steps of: providing a tie down strap system having at least a pair of tie down strap assemblies, each tie down strap assembly comprises a first strap member having a front end attached to a first securing means having a first bend and a second bend that residing in a front end loop by folding the front end of the first strap member over the second bend of the first securing means and sewn thereon and a rear end having a first holding loop, a second strap member having a first end attached to a second securing means having a first bend and a second bend and a second end having a second holding loop, a connecting means having a first slot and a second slot connecting the first strap member and the second strap member, the rear end of the first strap member being passed through the first slot to suspend therefrom and the first end of the second strap member being looped through the second slot and the first bend of the second securing means and sewn thereon thereby defining a first end loop and the second end of the second strap member extends and suspends from the first bend of the second securing means and an attachment means being connected to the first end of the second strap member as illustrated at block 202. The next step in the process is securing the first bend of the first securing means to a clamp member located on each side of the at least one transport medium as indicated at block 204. As shown at block 206, attaching the attachment means of each tie down strap assembly to a top portion of each side of a cab or a top of a cab of the at least one transport medium. In other alternative embodiments, the attachment means of each tie down strap assembly may be fitted to the other portions of a transport medium, such as an inside wall of a trailer or a topside or side of an automobile.

Next, loading the vehicle onto the platform of the at least one transport medium as indicated at block 208. After loading the vehicle on the platform of the at least one transport medium, pulling the second securing means of one of tie down strap assembly to detach the attachment means from the top portion of the cab of the at least one transport medium as indicated at block 210 and encircling the second end of the second strap member over at least one part of the vehicle as shown at block 212. Then, looping the second holding loop at the second end of the second strap member over the second bend of the second securing means as shown at block 214. Thereafter, successively repeating the pulling, encircling and looping steps for connecting another tie down strap assembly of the pair of tie down strap assemblies to secure the vehicle to the platform of the at least one transport medium as indicated at block 216.

Figure 3A:
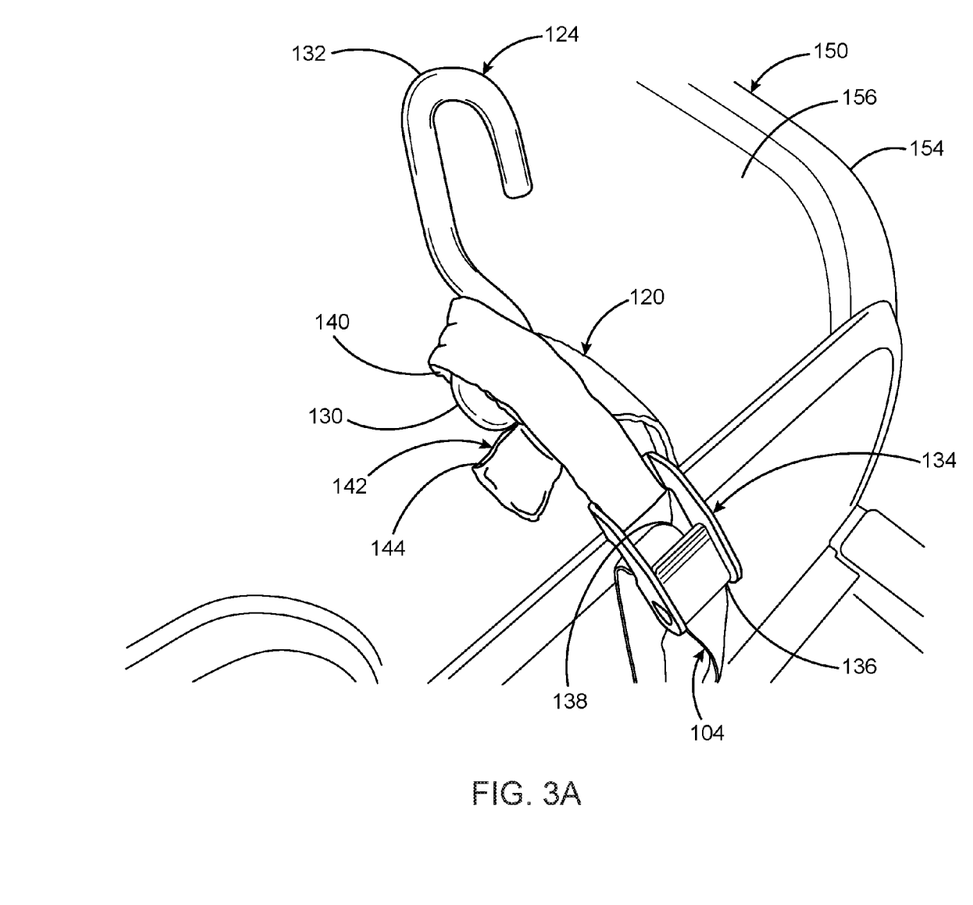
FIG. 3A illustrates an enlarged view of a second securing means shown in FIG. 1 attached to a connecting means in accordance with the preferred embodiment of the present invention.
Figure 3B:
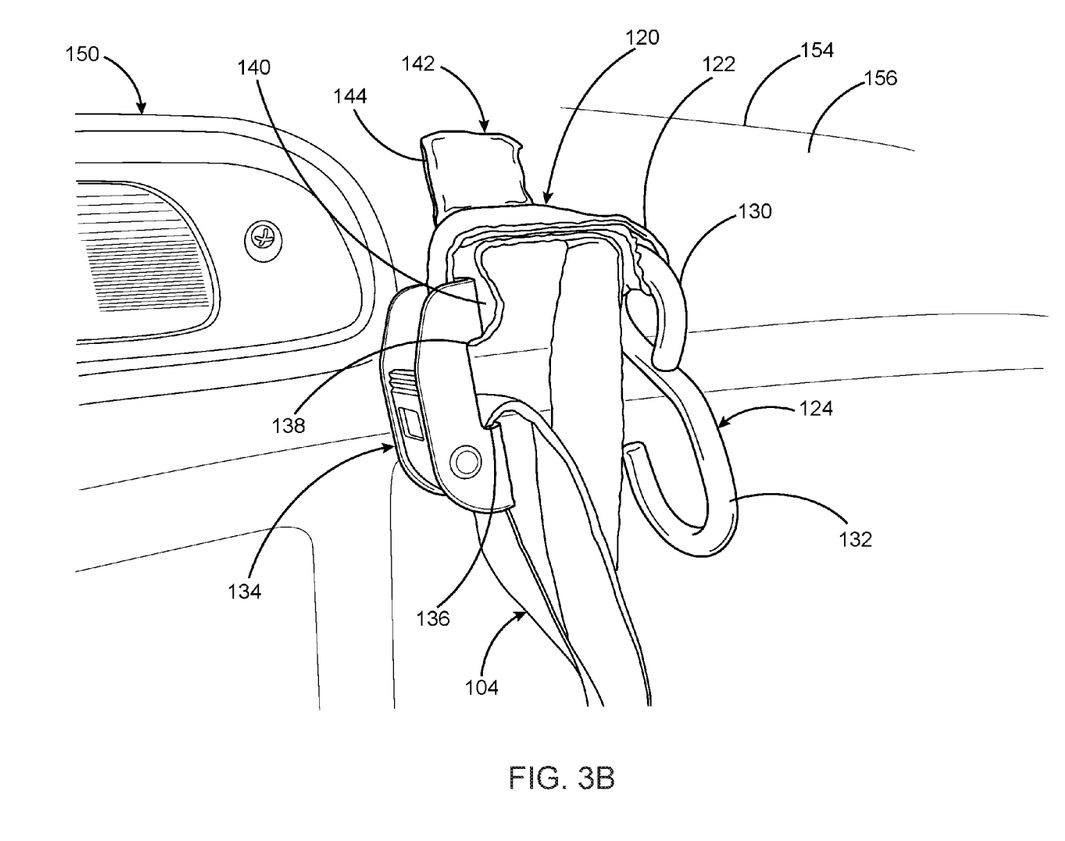
FIG. 3B illustrates an enlarged view of an attachment means shown in FIG. 1 attached on the top portion of the cab of the at least one transport medium in accordance with the preferred embodiment of the present invention.

FIGS. 3A and 3B illustrate the enlarged views of the second securing means 124 attached to the connecting means 134 and the attachment means 142 attached to the top portion 156 of the cab 154 of the at least one transport medium 150 in accordance with the preferred embodiment of the present invention. The second securing means 124 attached to the first end 122 of the second strap member 120 and the second holding loop 128 is attached to the second end 126 of the second strap member 120. As shown in FIGS. 3A and 3B, the rear end 110 of the first strap member 104 is passed through the first slot 136 of the connecting means 134 to suspend therefrom and the first end 122 of the second strap member 120 is looped through the second slot 138 of the connecting means 134 and the first bend 130 of the second securing means 124 and sewn thereon thereby defining a first end loop 140. The second end 126 of the second strap member 120 extends and suspends from the first bend 130 of the second securing means 124. The magnetic material 166 contained in the housing 144 of the attachment means 142 is strong enough to hold the tie down strap assembly 102 on the top portion 156 of the cab 154 of the at least one transport medium 150 as illustrated in FIG. 3B. The magnetic attraction between the attachment means 130 and the metal on the at least one transport medium 150 holds the attachment means 142 onto the cab 154 of the at least one transport medium 150. The attachment means 142 is configured to attach the pair of tie down strap assemblies 102 to the top portion 156 of the cab 154 of the at least one transport medium 150 and thus eliminates the need for the user to bend down and grab the second strap member 114 to secure the vehicle 160 to the platform 152 of the at least one transport medium 150 as shown in FIG. 3B. The user can even throw the tie down strap assembly 102 on the top portion 156 of the cab 154 of the at least one transport medium 150 to attach the magnetic material 166 to the top portion 156 of the cab 154 of the at least one transport medium 150 when the tie down strap assembly 102 is not in use. In one embodiment, the second securing means 124 and the first securing means 118 are also preferably made of a magnetic material 166 to stick onto the at least one transport medium 150. The magnetic material 166 is incorporated in any of or any combination of one or more strap members, securing means, holding loops, attachment means and connecting means. Explicitly stated, any portion of each tie down strap assembly can be incorporated with magnetic material 166 such that it may be affixed to the cab 154 of the at least one transport medium 150.

Figure 4:
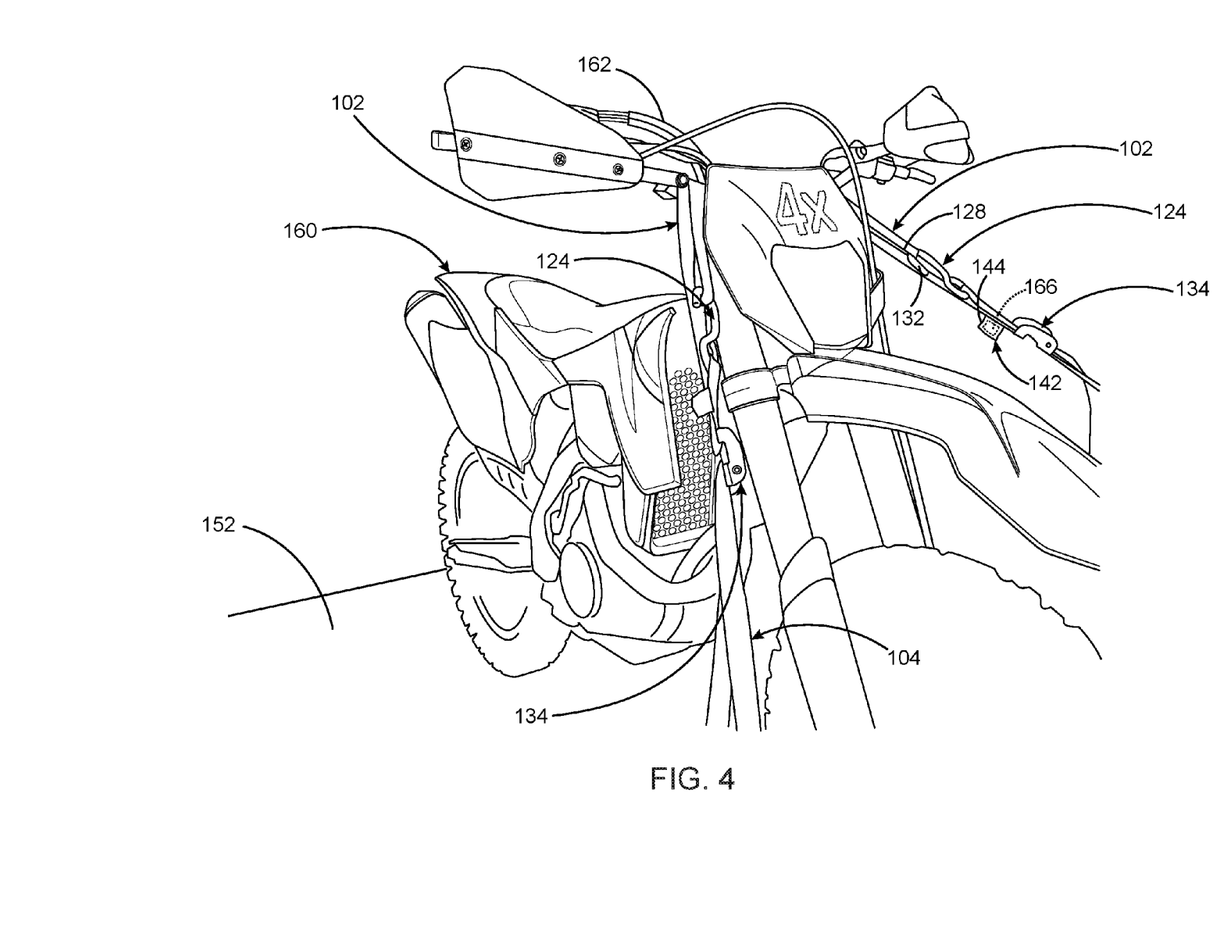
FIG. 4 illustrates a perspective view of a motorcycle secured to the platform of the at least one transport medium employing the tie down strap system in accordance with the preferred embodiment of the present invention.

FIG. 4 illustrates a perspective view of the vehicle 160 secured to the platform 152 of the at least one transport medium 150 employing the tie down strap system 100 in accordance with the preferred embodiment of the present invention. In the following description, a motorcycle 160 is used as a representative example of vehicle in accordance with the inventive subject matter described herein. When the motorcycle 160 is loaded on the platform 152 of the at least one transport medium 150, the user pulls the second securing means 124 to detach the attachment means secured to the top portion 156 of the cab 154 of the at least one transport medium 150 and the second end 126 of the second strap member 120 is encircled over a handlebar 162 of the vehicle 160 and looped the second holding loop 128 over the second bend 132 of the second securing means 124 thereby the tie down strap assembly 102 secures the vehicle 160 firmly to the platform 152 of the at least one transport medium 150. For example, as the attachment means 142 of each tie down strap assembly 102 is attached to the top portion 156 of the at least one transport medium 150 utilizing the magnetic material 166, the user doesn't need to stretch over the vehicle 160 and reach for the second strap member 120. The present embodiment thus allows the user to secure the vehicle 160 easily by just detaching the attachment means 142 attached to the top portion 156 of the at least one transport medium 150. Thus, the attachment means 142 eliminates the need for the user to bend down the other side of the vehicle 160 and grab the second strap member 120 while securing the vehicle 160 to the platform 152 of the at least one transport medium 150 utilizing the tie down strap assembly 102. The first holding loop 118 on the rear end 110 of the first strap member 104 is adapted to attach to any part of the vehicle 160 while securing the vehicle 160 to the platform 152 of the at least one transport medium 150 utilizing tie down strap assembly 102. Additional tie down strap assemblies 102 can be utilized if desired, to secure the vehicle 160 to the at least one transport medium 150 other than those mentioned above. The tie down strap assemblies 102 of the preferred embodiment can be utilized for securing any recreational vehicles. The recreational vehicles may include, but are not limited to street legal, race only and dirt motorcycles, scooters, four wheelers, all-terrain vehicles (ATV) and small personal water crafts like canoes, kayaks, paddle boards, surf boards etc.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A method for securing a vehicle to a platform of at least one transport medium, the method comprising the steps of:
   a) providing a tie down strap system having at least a pair of tie down strap assemblies, each tie down strap assembly comprising a first strap member having a front end attached to a first securing means, the first securing means having a first bend and a second bend, the second bend residing in a front end loop, wherein the front end loop is formed by folding the front end of the first strap member over the second bend of the first securing means and sewing that folded front end onto itself; the first strap member further comprising a rear end having a first holding loop, a second strap member having a first end attached to a second securing means having a first bend and a second bend and a second end having a second holding loop, a connecting means having a first slot and a second slot connecting the first strap member and the second strap member, the rear end of the first strap member being passed through the first slot to suspend therefrom, the first end of the second strap member being looped through the second slot and the first bend of the second securing means and sewn to itself thereby defining a first end loop and the second end of the second strap member extends and suspends from the first bend of the second securing means, an attachment means connected to the first end of the second strap member;
   b) securing the first bend of the first securing means of each tie down strap assembly to a clamp member located on each side of at least one transport medium;
   c) attaching the attachment means of each tie down strap assembly to the at least one transport medium;
   d) loading the vehicle onto a platform of the at least one transport medium;
   e) pulling the second strap member of one of tie down strap assembly to detach the attachment means from the at least one transport medium;
   f) encircling the second end of the second strap member over at least one part of the vehicle;
   g) looping the second holding loop at the second end of the second strap member over the second bend of the second securing means; and
   h) repeating the steps e) to g) for connecting another tie down strap assembly of the pair of tie down strap assemblies to secure the vehicle to the platform of the at least one transport medium.

2. The method of claim 1 wherein the first holding loop is adapted to attach to the vehicle while securing the vehicle to the platform of the at least one transport medium utilizing the tie down strap assembly.

3. The method of claim 1 wherein the first securing means and the second securing means is an S shaped hook.

4. The method of claim 1 wherein the attachment means comprises a housing containing a magnetic material that is adaptable to secure the tie down strap assembly on the top or backside portion of the cab of the at least one transport medium.

* * * * *